US00RE40290E

(19) United States
(12) Reissued Patent
Shei et al.

(10) Patent Number: US RE40,290 E
(45) Date of Reissued Patent: May 6, 2008

(54) HOLDING OR COOKING OVEN

(75) Inventors: Steven M. Shei, Fort Wayne, IN (US); Clement J. Luebke, Hudson, FL (US)

(73) Assignee: Duke Manufacturing Company, St. Louis, MO (US)

(21) Appl. No.: 10/732,889

(22) Filed: Dec. 10, 2003

Related U.S. Patent Documents

Reissue of:
(64) Patent No.: 6,541,739
Issued: Apr. 1, 2003
Appl. No.: 09/906,866
Filed: Jul. 17, 2001

U.S. Applications:
(

(63) Continuation of application No. 09/756,941, filed on Jan. 9, 2001, now Pat. No. 6,262,394, which is a division of application No. 09/538,761, filed on Mar. 30, 2000, now Pat. No. 6,175,099, which is a continuation-in-part of application No. 09/282,313, filed on Mar. 31, 1999, now abandoned.

(51) Int. Cl.
*A47J 36/24* (2006.01)
*F24C 7/04* (2006.01)
*F27B 5/02* (2006.01)

(52) U.S. Cl. ..... 219/399; 219/385; 219/394; 99/483

(58) Field of Classification Search ..... 219/214, 219/385, 394, 399, 428; 99/483; 222/146.5; 220/345.1, 351
See application file for complete search history.

(56) References Cited

U.S. PATENT DOCUMENTS 466,416 A 1/1892 Hunt
804,110 A 11/1905 Favorite et al.
2,076,091 A 4/1937 O'Neill
2,964,609 A 12/1960 Anoff
3,051,582 A 8/1962 Muckler et al.
3,313,917 A 4/1967 Ditzler et al.
3,353,885 A 11/1967 Hanson
3,353,886 A 11/1967 Tompkins
3,681,568 A 8/1972 Schaefer
3,751,629 A 8/1973 Eisler
3,752,640 A 8/1973 Schneider
3,908,749 A 9/1975 Williams
4,024,377 A 5/1977 Henke
4,110,587 A 8/1978 Souder, Jr. et al.
4,198,559 A 4/1980 Walter et al.
4,235,282 A 11/1980 de Filippis et al.
4,784,054 A 11/1988 Karos et al.
4,967,995 A 11/1990 Burgess
5,188,020 A 2/1993 Buchnag
5,235,903 A 8/1993 Tippmann
5,365,038 A 11/1994 Mitsugu
5,496,987 A 3/1996 Siccardi et al.
5,653,905 A 8/1997 McKinney
5,724,886 A 3/1998 Ewald et al.
5,783,803 A 7/1998 Robards, Jr.
5,852,967 A 12/1998 Fortmann et al.
5,900,173 A 5/1999 Robards, Jr.
5,947,012 A 9/1999 Ewald et al.
6,011,243 A 1/2000 Arnold
6,031,208 A 2/2000 Witt et al.
6,116,154 A * 9/2000 Vaseloff ..... 99/483
6,175,099 B1 1/2001 Shei et al.
6,250,215 B1 * 6/2001 Brenn ..... 99/468
6,262,394 B1 7/2001 Shei et al.
6,412,403 B1 * 7/2002 Veltrop ..... 219/214
6,658,994 B1 * 12/2003 McMillan ..... 219/214

FOREIGN PATENT DOCUMENTS

GB 829 729 3/1960

* cited by examiner

*Primary Examiner*—Joseph Pelham
(74) *Attorney, Agent, or Firm*—Senniger Powers

(57) ABSTRACT

An oven for maintaining cooked foods at temperatures suitable for serving the foods or even for cooking foods has a cabinet containing multiple heat sinks of channel-shaped configuration. The ends of the heat sinks open out of the cabinet, so that any heat sink may receive a tray of food from either the front or back of the cabinet. [The interior surface of the heat sinks generally conform to the cross-sectional shapes of the trays, so that the heat sinks lie along the bottoms and sides of the trays. The heat sinks have a heating elements extended along their sides and bottoms for elevating the temperature of the heat sinks and directing heat into the trays within the heat sinks. In addition, each heat sink also contains a cover which may close the top of the tray in the heat sink and thereby retard the escape of moisture from the tray or may vent the interior of the tray.] *In other embodiments, the oven includes a cabinet having a plurality of compartments therein, and a plurality of trays in the compartments, each compartment being sized for receiving only one tray per compartment. The compartments are isolated from one another in the cabinet whereby flavor from food in one tray in one compartment is prevented from transferring to food in trays in adjacent compartments.*

46 Claims, 6 Drawing Sheets

HOLDING OR COOKING OVEN

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of application Ser. No. 09/756,941, filed Jan. 9, 2001 (on which U.S. Pat. No. 6,262,394 will issue on Jul. 17, 2001), which is a division of application Ser. No. 09/538,761, filed Mar. 30, 2000, (on which U.S. Pat. No. 6,175,099 issued on Jan. 16, 2001), which is a continuation-in-part of application Ser. No. 09/282,313 filed Mar. 31, 1999, (now abandoned).

STATEMENT REGARDING FEDERALLY SPONSORED RESEARCH OR DEVELOPMENT

Not Applicable.

BACKGROUND OF THE INVENTION

This invention relates in general to ovens and more particularly to an oven for maintaining foods at temperatures suitable for serving or even for cooking foods.

Most restaurants which specialize in serving cooked food rapidly—indeed, essentially with the placement of an order—do not have the capacity to prepare large quantities of food on demand. Thus, traditional meal times, particularly the noon hour, place severe demands on these restaurants. Typically, the so-called "fast food" restaurant will prepare some cooked food in advance of a meal time and keep that food warm in a holding oven. Then, during a meal time when the demand is greatest, it will use the food previously cooked.

Some cooked foods, such as hamburger patties, should be held at elevated temperatures only in a moist environment, since these foods, when depleted of their moisture content have poor taste and texture. Other cooked foods, such as breaded chicken or fish fillets, should be stored such that moisture may escape, so that they remain crisp. While it is convenient to store different foods at the same location, the flavor of one food should not transfer to another food. Moreover, irrespective of the food, the temperature at which it is stored must remain high enough to prevent bacterial contamination, and this generally requires holding the food at temperatures in excess of about 150° F. Holding ovens that are currently in use in fast food restaurants do not fully satisfy these requirements.

The holding ovens of current manufacture accept trays containing the cooked foods. The typical oven has a cabinet containing storage spaces which are accessible from both the front and rear of the cabinet, so that a tray containing cooked food may be placed into a storage space at one face of the cabinet and withdrawn at the other face. Each storage space has a heated platen along its top and also preferably at its bottom, and these platens transfer heat to the trays. The cabinet also contains a mechanism for closing the upper ends of the trays to prevent moisture from escaping. In one type of holding oven this mechanism resides in making the spacing between a heated platen on which the tray rests and the heated platen which overlies the tray about equal to the height of the tray, so that the upper margin of the tray lies along and essentially against the overlaying platen, thus in effect closing the tray. See U.S. Pat. No. 5,724,886. Another type of holding oven supports the tray on a resilient grate which urges a tray upwardly against an overlying heated platen, thereby effecting a seal with the overlying platen. See U.S. Pat. No. 5,783,803. These ovens are difficult to clean and do not efficiently concentrate the heat at the trays where it is needed. As a consequence, the food is often held at a temperature less than optimum. Sometimes, the spaces in these ovens hold trays with their tops open and this leads to a transfer of flavors between multiple trays in any one space. In any event, ovens of current manufacture have the capacity to store foods for only very limited periods of time.

BRIEF SUMMARY OF THE INVENTION

The present invention resides in an oven having a channel-shaped heat sink which is heated by a heater. The heat sink has a storage cavity which generally conforms to the shape of a tray or other food container received in the cavity. As such, the heat sink concentrates the heat generated by the heater at the tray so as to efficiently maintain the food in the tray at a temperature suitable for serving. The heat sink may have a cover for closing the top of the tray within it. Where the oven contains multiple heat sinks, these heat sinks are isolated from each other to prevent the flavor of the food in one from transferring to food in another.

*In another aspect, this invention is directed to an oven comprising a cabinet having a plurality of compartments therein, and a plurality of trays in the compartments, each compartment being sized for receiving only one tray per compartment. The compartments are isolated from one another in the cabinet whereby flavor from food in one tray in one compartment is prevented from transferring to food in trays in adjacent compartments. Each compartment has open ends for placement of the tray in the compartment and removal of the tray from the compartment. The oven also includes a plurality of heaters, each heater being operable for heating a respective compartment.*

*In another aspect, this invention is directed to an oven comprising a cabinet having a plurality of compartments therein, and a plurality of trays in the compartments, each compartment being sized for receiving only one tray per compartment. The compartments are isolated from one another in the cabinet whereby flavor from food in one tray in one compartment is prevented from transferring to food in trays in adjacent compartments. Each compartment has open ends for placement of the tray in the compartment and removal of the tray from the compartment. The oven also includes a plurality of heaters for heating the plurality of compartments, the operation of each of the plurality of heaters being controlled independently of the other heaters.*

*In another aspect, this invention is directed to an oven comprising a cabinet having a plurality of compartments therein, and a plurality of trays in the compartments, each compartment being sized for receiving only one tray per compartment. The compartments are isolated from one another in the cabinet whereby flavor from food in one tray in one compartment is prevented from transferring to food in trays in adjacent compartments. Each compartment has open ends for placement of the tray in the compartment and removal of the tray from the compartment. The oven also includes a plurality of heaters for heating the plurality of compartments, each compartment being heated by one of said plurality of heaters located adjacent the compartment. The operation of at least one group of the plurality of heaters is controlled independently of another group of the plurality of heaters. A cover is provided in at least one of the plurality of compartments for covering a tray in the compartment.*

BRIEF DESCRIPTION OF THE SEVERAL VIEWS OF THE DRAWINGS

In the accompanying drawings which form part of the specification and wherein like numerals and letters refer to like parts wherever they occur.

Corresponding reference numerals will be used throughout the several figures of the drawings.

DETAILED DESCRIPTION OF THE INVENTION

Figure 1:
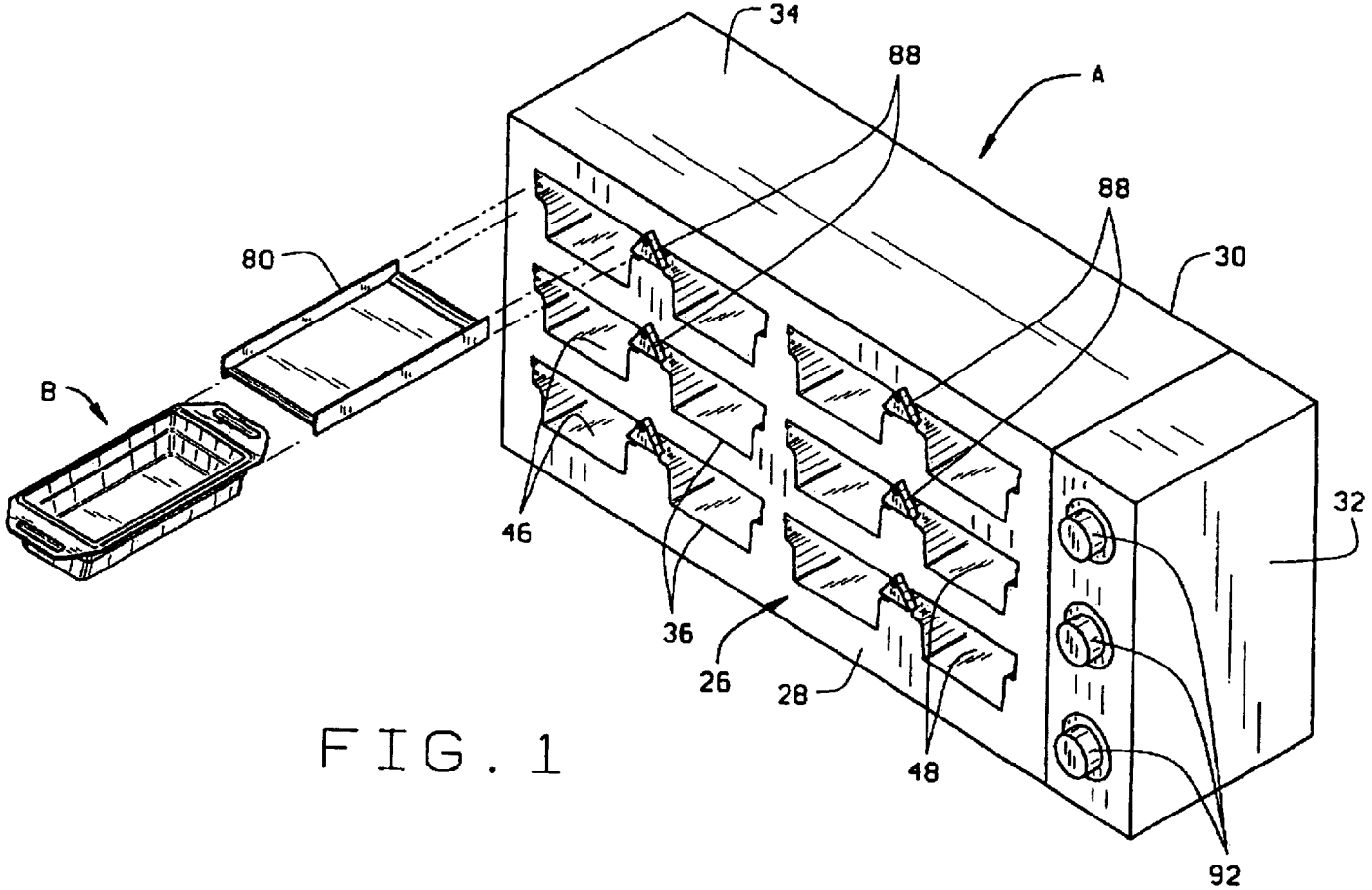
FIG. 1 is a front and top perspective view of a holding oven constructed in accordance with and embodying the present invention, with one of the covers and one of its trays shown removed.
Figure 2:
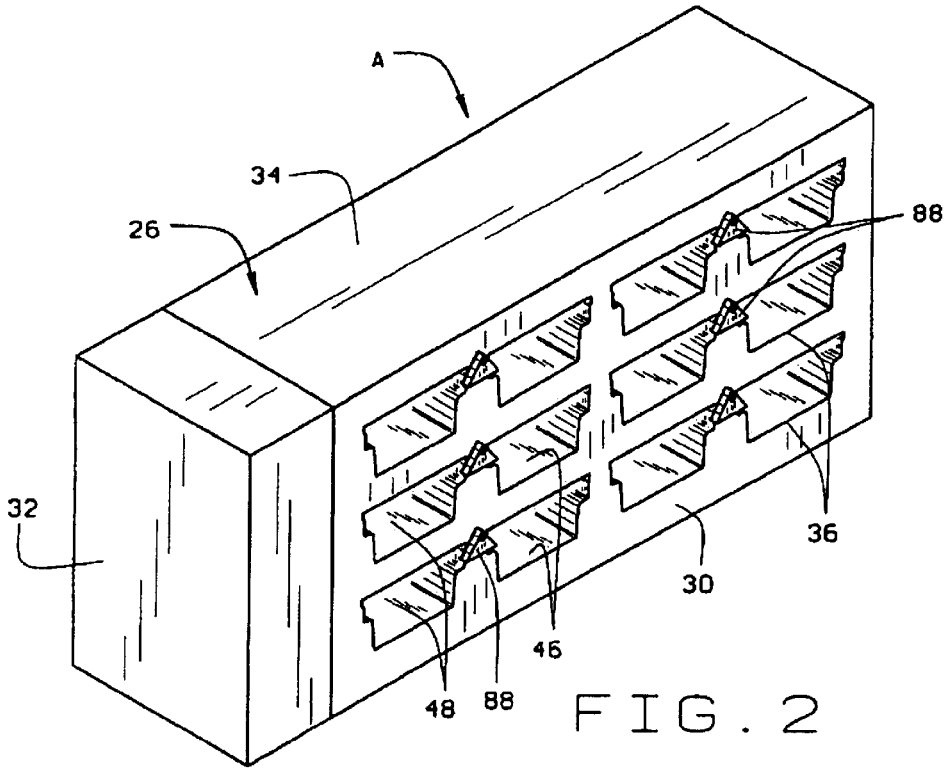
FIG. 2 is a top and rear perspective view of the oven.

Referring now to the drawings, an oven A (FIGS 1 & 2) holds multiple trays B in which precooked food is placed and held for limited times, indeed, several hours in the case of some foods. The oven A and the trays B, which are used with it, will accommodate a variety of foods typical of those served in fast food restaurants. Among those foods are cooked hamburger patties, ham, bacon, sausage, onion rings, French toast, fish fillets, chicken fillets and biscuits. Thus, the trays B constitute food containers. The oven A heats the trays B from their bottoms as well as their sides. Moreover, one who places a tray B in the oven A has the option of closing the top of the tray B so as to retain moisture in the tray B or leaving the top open so that moisture may escape from the tray B.

Figure 3:
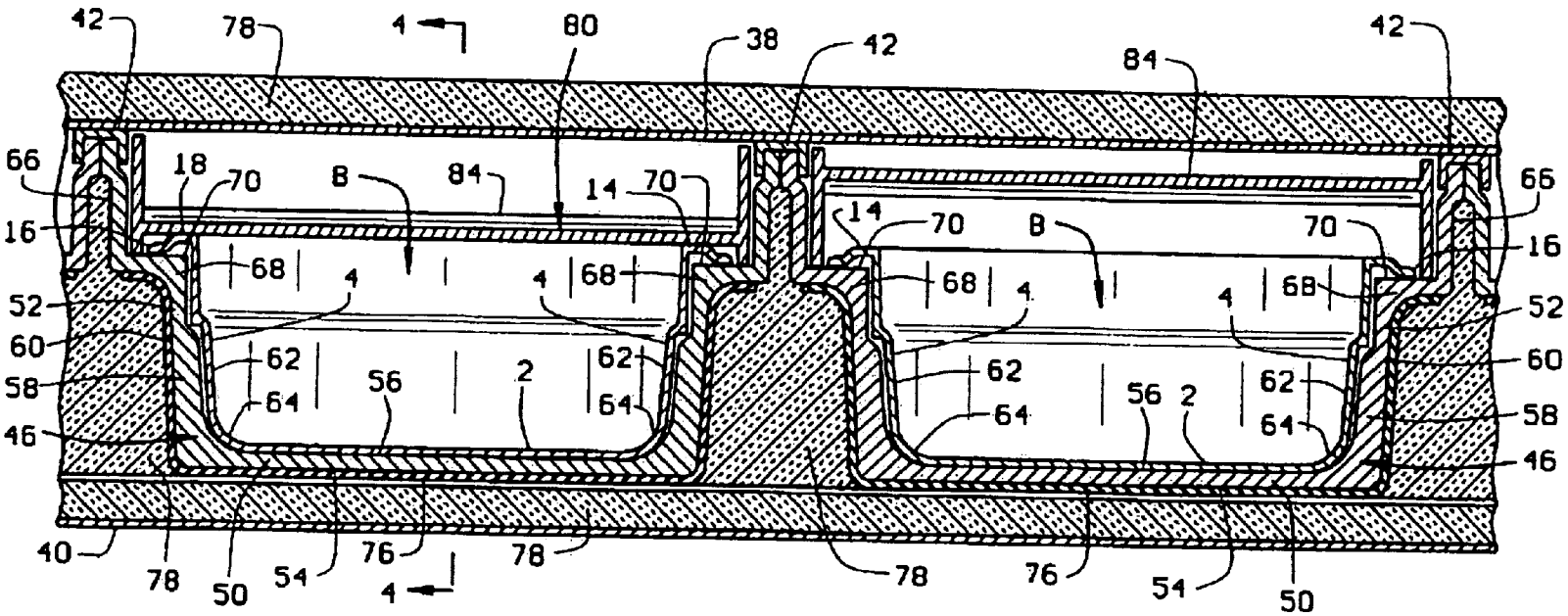
FIG. 3 is a transverse sectional view of two heat sinks, one having its cover in its sealing position and the other having its cover in the venting position.
Figure 4:
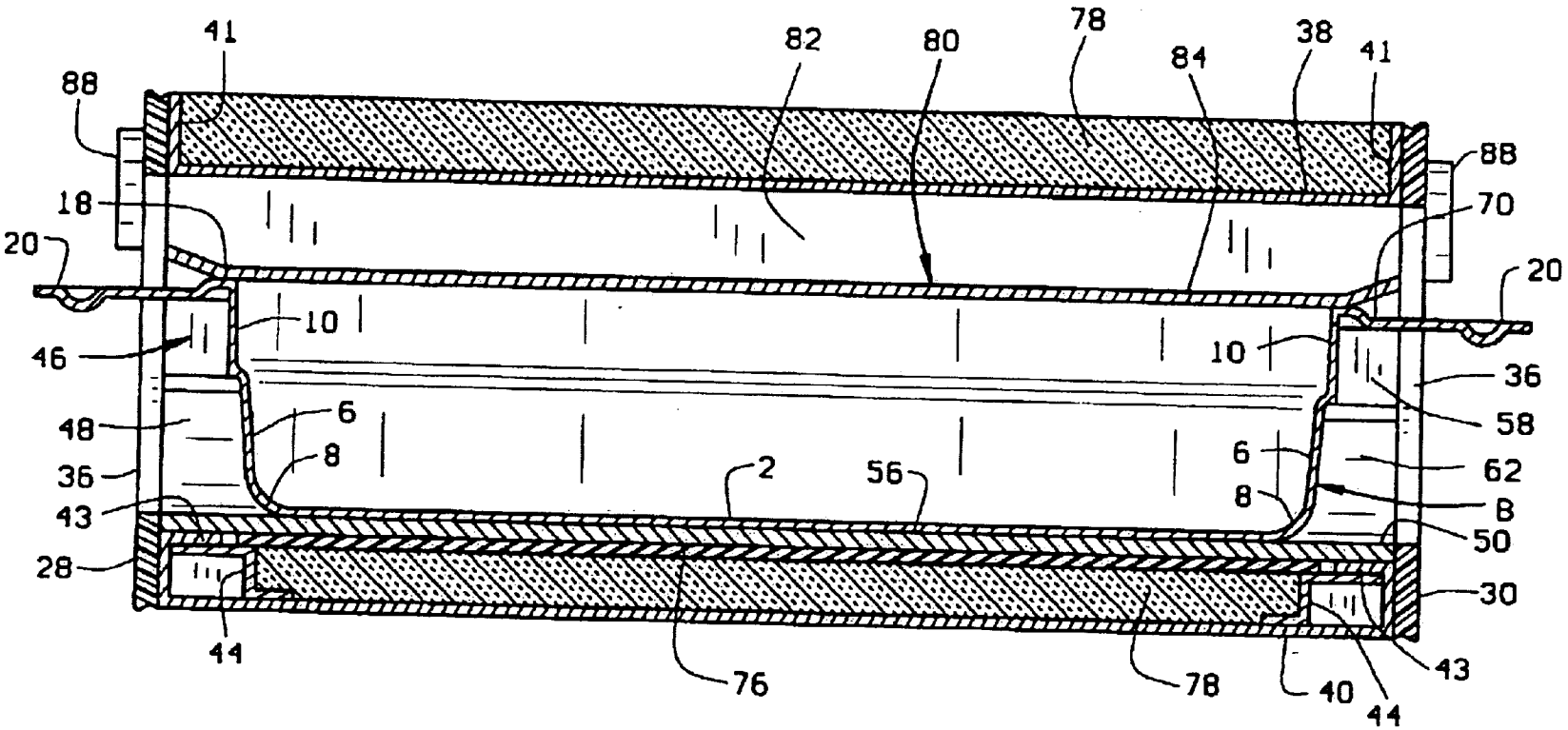
FIG. 4 is a fragmentary sectional view taken along line 4—4 of FIG. 3.
Figure 5:
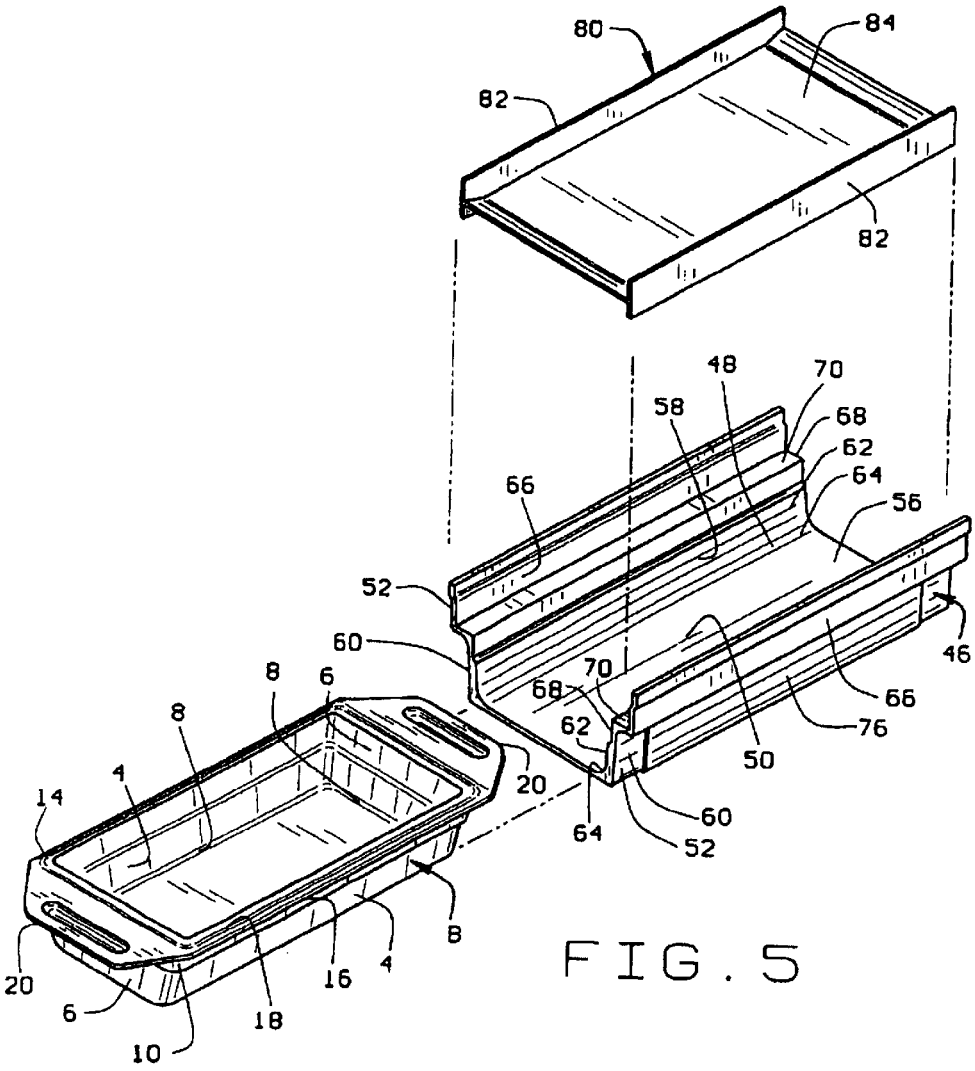
FIG. 5 is an exploded perspective view of a heat sink, the cover for the heat sink, and a tray.

Considering the trays B first, they are preferably molded from a polymer that is capable of withstanding the temperatures maintained in the oven A, although trays B of stamped metal will suffice as well. In any event, such a tray B has (FIGS. 3–5) a flat bottom wall 2 and also side walls 4 and end walls 6 that merge with the bottom wall 2 at corners 8 of generous radius. The side walls 4 and end walls 6 flare outwardly slightly and each has an offset portion 10 near its upper end. The offset portions 10 of the walls 4 and 6, along their upper margins, merge into a rim in the form of a peripheral lip 14 which projects laterally outwardly and, beyond the side walls 4, turns slightly downwardly at a depressed edge 16 (FIG. 3). The lip 14 has a flat upper surface 18 that lies in a common plane along the entirety of the lip 14. At the end walls 6 the lip 14 merges into handles 20 which lie below the plane of the upper surface 18. Similar trays see widespread use in fast food restaurants.

The oven A includes (FIGS. 1 & 2) a cabinet 26 having a front panel 28, a rear panel 30, end panels 32, and a top panel 34. The front panel 28 and rear panel 30 contain openings 36 which conform generally to the cross-sectional configuration of the trays B, but are slightly wider and somewhat taller. The openings 36 are arranged in several tiers, and for every opening 36 in the front panel 28 an opening 36 in the rear panel 30 aligns with it. The cabinet 26 at each tier of openings 36 also has (FIGS. 3 and 4), an upper pan 38 that extends through it above the openings 36 and a lower pan 40 that extends through it below the openings 36. The upper pan 38 has a peripheral lip 41 which projects upwardly and imparts rigidity to the pan 38. The pan 38 carries channels 42 which extend between the front and rear panels 28 and 30 in the regions between the openings 36. More channels 42 lie beyond the two endmost openings 36 as well. The channels 42 are attached firmly to the pan 38 and open downwardly. The lower pan 40 for each tier has lips 43 that project upwardly and turn inwardly and, beneath the inwardly turned portions, has rigidifying members 44. The space between the upper and lower pans 38 and 40 for each tier of openings 36 is occupied by several heat sinks 46—one for each pair of aligned openings 36 in the tier.

Each heat sink 46 is formed from a substance that conducts heat well, aluminum being preferred. When formed from aluminum, the heat sinks 46 may be produced as extrusions or castings or they may even be produced by machining. Irrespective of how it is produced, each heat sink 46 possesses (FIG. 5) a channel-like configuration in that it is open at both ends and at its top and closed along its two sides and bottom. This leaves the heat sink 46 with a cavity 48 that extends the full length of the heat sink 46. The open ends of the cavity 48 align with openings 36 in the front and rear panels 28 and 30 of the cabinet 26, so that the cavity 48 of the heat sink 46 is easily accessible from the exterior of the oven A. The cavity 48 generally conforms to the exterior cross-sectional configuration of any tray B.

More specifically, each heat sink 46 includes (FIGS. 3 & 5) a bottom wall 50 and side walls 52 which are formed integral with the bottom wall 50 and project upwardly from it. The bottom wall 50 is of uniform thickness, it being about 3/16 in. thick, and has a flat bottom surface 54 and a flat top surface 56. In contrast, the two side walls 52, while being mirror images of each other, have somewhat varied thickness. Each side wall 52 has a lower region 58 that generally corresponds in height to the height of a tray B. The lower region 58 has a flat outside surface 60 and a contoured inside surface 62 that merges with the flat top surface 56 of the bottom wall 50 at a curved corner 64. Immediately above the corner 64, the inside surface 62 flares outwardly slightly, then after undergoing a more abrupt change in direction, extends vertically for a lesser distance. The spacing between the inside surfaces 62 for the side walls 52 of the heat sink 46 is slightly greater than the width of the tray B measured across of the outside surfaces of its side walls 4. Moreover, the inside surfaces 62 of the side walls 52 on the heat sink 46 generally conform in configuration to the outside surfaces for the side walls 4 of the tray B. When the tray B is inserted into the heat sink 46 with the bottom wall 2 of the tray B resting in the flat top surface 56 of the bottom wall 50 for the heat sink 46, the side walls 4 of the tray B, despite their contoured configuration, are close to the inside surfaces 62 on the side walls 52 of the heat sink 46. Generally, the spacing at any elevation between the inside surfaces 56 on side walls 52 of the heat sink 46 should be no more than about 1.0 in. larger than the spacing between the side walls 4 of the tray B at the outside surfaces of those side walls 4. Thus, when the tray B is centered in the cavity 48 of the heat sink 46, a clearance of no more than about 0.5 in. exists between the inside surfaces 62 of the side walls 52 for the heat sink 46 and the outside surfaces in the side walls 4 of the tray B. Preferably, when the tray B is centered, the clearance is about 0.015 in. The curved corners 64, where the flat bottom surface 54 and contoured inside surfaces 62 of the heat sink 46 merge, lie opposite, yet close to, the corners 8 of the tray B.

The lower region 58 of each side wall 52 for the heat sink 46 merges into an upper region 66 at an offset 68. The upper regions 66 extend vertically and by reason of the offsets 68, the spacing between the upper regions 66 exceeds the spacing between the lower regions 58. Indeed, that spacing exceeds the width of the tray B at its peripheral lip 14. The contoured inside surfaces 62 on the lower regions 58 of the side walls 52 rise to flat horizontal shoulders 70 which extend over the offsets 68 and out to the upper regions 66. The shoulders 70 lie in a plane that is parallel to the top surface 56 of the bottom wall 52, and the distance between the shoulders 70 and the top surface 56 is slightly less than the distance between the lower surface of the bottom wall 2 for the tray B and the undersurface of the lip 14 at the side walls 4 which undersurface is at the depressed edge 16. Thus, when the tray B rests on the bottom wall 2 of the heat sink 44, the depressed edge 16 of the lip 14 beyond each side wall 4 lies slightly above the shoulders 70. The lip 14 remains well below the upper edges of side walls 52 for the heat sink 46.

Those upper edges lie along the upper regions 66 of the side walls 52 for the heat sink 46, and here the upper regions 66 are enlarged slightly and received in the channels 42 that are attached to the upper pan 38 for the tier in which the heat sink 46 lies (FIG. 3). The bottom wall 50 of the heat sink 46 at its ends rests on the inwardly turned portions of the lips 43 for the lower pan 40. (FIG. 4) to which it is fastened. Thus, the heat sinks 46 for any tier are captured between the upper and lower pans 38 and 40 for the tier. The channels 42 confine the heat sinks 46 of the tier laterally, whereas the front and rear panels 28 and 30 confine them longitudinally. In short, the heat sinks 46 are fixed in position in the cabinet 26.

Each heat sink 46 is fitted with a heater which may take the form of a flexible heating element 76 of the electrical resistance type. It extends almost the full length of the heat sink 44, covering the flat bottom surface 54 of the bottom wall 50, the corners between the bottom wall 50 and side walls 52, and the flat outside surfaces 60 on the lower regions 58 of the side walls 52. It even curves outwardly along the bottom surfaces of the offsets 68 in the side walls 52. To these surfaces, the heating element 76, which is preferably film-etched, is bonded, preferably with a silicone adhesive capable of withstanding the elevated temperatures produced by the heating element 76. In this regard, the heating element 76 should produce enough heat and reach a temperature high enough to elevate the temperature of the heat sink 46 along the top surface 56 of its bottom wall 50 and along the contoured inside surface 62 of its side walls 52 to a temperature suitable for maintaining food within the tray B that occupies that heat sink 46 at any desired temperature. Where the oven A serves as a holding oven, that temperature keeps the food warm enough for serving and warm enough to prevent bacterial contamination. Where the oven A functions as a cooking oven, that temperature is hot enough to actually cook the food.

Other types of heaters may be used as well. For example, the heater may take the form of resistance type heating rods embedded in the bottom wall 50 and in the lower regions 58 of the side walls 52. Steam or hot water may be circulated through channels in the bottom wall 50 and lower regions 58 of the side walls 52 to maintain the heat sink 46 at an elevated temperature, in which case the channels and the fluid that flows within them become the heater. On the other hand, if the heat sink 46 is formed from a ferrous material, an induction heating device may be used to elevate the temperature.

Behind the side walls 52 of each heat sink 46 and beneath its bottom wall 50, as well, the cabinet 26 is packed thermal insulation 78. The lower pans 40 in the cabinet 26 support the insulation 78 and prevent the insulation 78 for any one tier of heat sinks 46 from dropping into the heat sinks 46 of the tier below.

In addition to its heating element 78, each heat sink 46 is equipped with a cover 80 that rests on the shoulders 70 of its offsets 68 and generally occupies the space between the upper regions 66 of its side walls 52. The cover 80 includes a pair of vertical legs 82 and a cross wall 84 that extends between and is attached to the vertical legs 82. Indeed, the cross wall 84 is joined to the vertical legs 82 between the longitudinal edges of the legs 82, it being offset closer to one longitudinal edge of each leg 82 than the other. However, near its ends the cross wall 84 flares away from the edges to which it is closest. The width of the cross wall 84 slightly exceeds the width of the tray B at its lip 14. The height of the vertical legs 82 is slightly less than the height of the upper regions 66 of the two side walls 52 for the heat sink 44. These dimensions enable one to easily slide the cover 80 into and out of the upper region of its heat sink 44.

The configuration of the cover 80 is such that it may assume two positions within the space between the upper regions 66 of the side walls 52 for the heat sink 44—a closing position (FIG. 3-left) and a venting position (FIG. 3-right). In the closing position the cross wall 84 of the cover 80 rests on the upper surface 18 of the lip 14 of the tray B, or else lies slightly above the upper surface 18 of the lip 14. In either arrangement the cross wall 84 serves as a closure for the tray B. Where the cross wall 84 actually rests on the lip 14 the legs 82 project downwardly almost to the flat horizontal shoulders 70 of the heat sink 46, but do not contact the shoulders 70. The lower margins of the legs 82 lie between the lips 14 on the tray B and the upper regions 66 of the side walls 52 for the heat sink 46. When the tray B is removed from the heat sink 46, the legs 82 of the cover 80 drop downwardly and rest on the shoulders 70 of the heat sink 46. But the ends of the cross wall 84 flare upwardly, leaving enough space between the shoulders 70 and those flared ends to accommodate the handles 20 of a tray B. On the other hand, where the cross wall 84 lies slightly above the upper surface 18 on the lip 14, the legs 82 project downwardly to and actually rest on the flat horizontal shoulders 70 of the heat sink 46 with the lip 14 on the tray B being between the regions of contact. A clearance ranging up to 0.375 in. exists between the bottom of the cross wall 84 and the upper surface 18 on the lip 14. The legs 82 extend up to and nearly contact the overlying upper pan 38 of the cabinet 26. In the venting position the cover 80 is reversed. Its legs 82 rest on the shoulder 70 of the heat sink 46 outwardly from the peripheral lip 14 of the tray B, but the cross wall 84 lies well above the peripheral lip 14 and the handles 20. This leaves an open space of at least 0.375 in. between the cross wall 84 of the cover 80 and upper surface 18 on the lip 14 of the tray B at each end wall 6 of the tray B, and moisture from the tray B may escape through these spaces.

At the sides of the openings 36 in the front panel 28 and rear panel 30, the cabinet 26 is fitted with pivotal stops 88 of the triangular configuration. Each triangular stop 88 serves two openings 36. It pivots at one of its apices, with the pivot axis being slightly above, but otherwise between, the two openings 36 that the stop 88 serves. The other two apices project beyond the upper regions 66 of the nearby side walls 52 for the heat sinks 46 at those openings 35. As such, those other apices project past the ends of the openings 36, but not across, the opening 36.

The free apices of the stops 88 lie beyond the ends of the vertical legs 82 for the covers 80 and retain the covers 80 in the upper regions of the heat sinks 46. However, to reverse a cover 80 and thereby change its position, the stop 88 at the heat sink 46 in which the cover 80 fits, is pivoted away from the opening 36 at that heat sink 46 so as to no longer block the opening 36. While the stop 88 is held away from the opening 36, the cover 80 is removed and reversed. Then the cover 80 is inserted back through the opening 36 in the reversed position. Once the cover 80 is fully within the heat sink 44, the stop 88 is released, and it assumes its normal position, blocking the end of the opening 36 and thereby retaining the cover 80 in the heat sink 46.

Finally, the cabinet 26 contains electrical controls 92 which control the temperature at which the heating elements 78 of the sinks 46 operate. A separate control 92 exists for each tier of heat sinks 44. However, the controls 92 may be such that each heat sink 46 is controlled individually.

The oven A normally awaits use in a restaurant with some of its covers 80 in the sealing position and the remainder of its covers 80 in the venting position. As a meal time approaches, the employees of the restaurant cook various foods for which the restaurant expects to receive orders during the meal time. Immediately after these foods are prepared, they are placed in the trays B, each food being assigned to a different tray B. Some of these foods, such as hamburger patties, loose their taste and texture with loss of moisture. Others, such as fried chicken fillets, biscuits, and eggs become soggy if stored in an abundance of moisture. The trays B which contain foods that must remain moist are placed in heat sinks 44 having their covers 80 in the closing position (FIG. 3-left). The trays B containing foods which must remain crisp are placed in heat sinks 44 in which the covers 80 are in the venting position (FIG. 3-right). Each heat sink 44 directs heat through the bottom wall 2 and side walls 4 of the tray B that is within it, and the heat keeps the food in tray B warm—indeed, warm enough to prevent bacterial contamination and warm enough to serve to patrons of the restaurant when the demand arises, all with the flavor and texture preserved.

To insert a tray B into a heat sink 44 having its cover 80 in the closing position, the restaurant employee brings the tray B to the rear panel 30 of the cabinet 26 and aligns it with one of the openings 36 at a heat sink 46, the cover 80 for which is in its closing position. The employee inserts the handle 20 of the tray B beneath the upwardly flared end on the cross wall 84 for the cover 80 in that heat sink 46. Thereupon, the employee advances the tray B into the heat sink 46, with the lip 14 of the tray B passing beneath the cross wall 84 of the cover 80. When the tray B is fully within the heat sink 46, the cross wall 84 of the cover 80 establishes a closure over the open top of the tray B and that wall 84 lies over the entire lip 14 along the periphery of the tray B. Moisture remains trapped within the tray B, even though the heat which is supplied by the heat sink 46 has the capacity to drive moisture from the food. As a consequence, the food in the tray B retains its taste and texture.

On the other hand, if the tray B contains a food which must remain crisp, the employee selects a heat sink 46 which has its cover 80 in the venting position. The tray B when aligned with the opening 36 for this heat sink 46 passes easily into the cavity 48 of the heat sink 46 with little manipulation, its lip 14 passing over the shoulders 70 of the heat sink 46 and its bottom wall 2 over the top surface 56 for the bottom wall 50 of the heat sink 46. The cross wall 84 for the cover 80 remains well above the lip 14 on the tray B, so that moisture from the food within the tray B may escape at the open ends of the cover 80, that is to say over the end walls 6 of the tray B and beneath the cross wall 84 of the cover 80.

When the demand for a particular food arises within the restaurant, other employees remove the tray B containing that food from the oven A. This simply involves grasping the tray B by one of its handles 20 and withdrawing it from its heat sink 46. In this regard, the handles 20 project beyond the front and rear panels 28 and 30 of the cabinet 26 and are easily accessible.

Any cover 80 is easily withdrawn from its heat sink 46 by pivoting the stop 88 at the one end of the heat sink 46 away from the opening 36 at the end of that heat sink 46. This leaves the cavity 48 of the heat sink 46 unobstructed, and it is easily cleaned, owing to its continuous and smooth surfaces. It also enables an employee to easily clean the cover 80. And, of course, it permits the employee to reverse the position of the cover 80.

The heat sink 46 efficiently transfers heat from its heating element 76 to the tray B, thereby keeping the contents of the tray B at a desired temperature with minimum expenditure of electrical energy. The foods in the tray B that are withdrawn, even as long as several hours after being inserted into the oven A, have essentially the taste and texture that they possessed immediately after being cooked. Since the trays B are totally isolated from each other in *separate compartments in* the cabinet 26, even when the covers 80 over those trays are in their venting positions, flavors are not transferred between the foods in different trays B. *In one embodiment (FIGS. 3 and 4), each compartment is defined by bottom wall 50, side walls 52, and top wall 38 and is sized for receiving only one tray B per compartment.*

Figure 6:
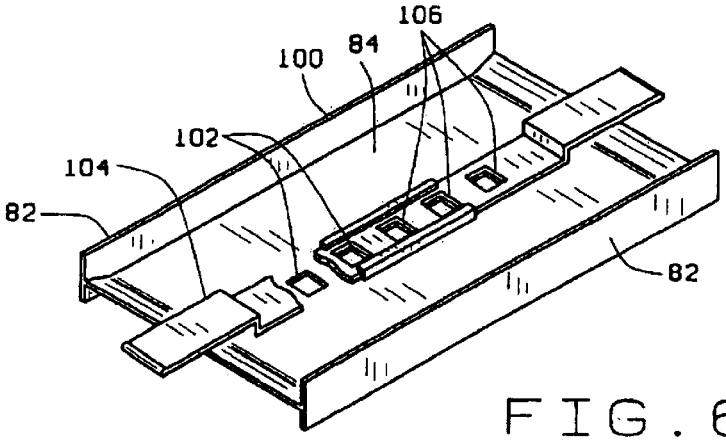
FIG. 6 is a perspective view of a modified cover.

A modified cover 100 (FIG. 6) has side legs 82 and a cross wall 84 of essentially the same configuration as their counterparts in the cover 80. However, the cross wall 84 contains openings 102 arranged in a row between the legs 82. It also carries a slide 104 which likewise contains openings 106. The slide 104 is captured on the cross wall 84 such that it cannot be lifted from the cross wall 84, yet it can slide longitudinally over the wall 84. Indeed, the slide 104 projects beyond the ends of the cross wall 84, so that it can be manipulated from the exterior of the oven A to assume various positions on the cross wall 84. In one position, the slide completely covers the openings 102 in the wall 84, and in this position the tray B is sealed. In other positions the slide 104 exposes the openings 102 in the wall 84 through its own openings 106, with the amount of exposure being dependent in the position of the slide 104. In these positions the tray B is vented.

Figure 7:
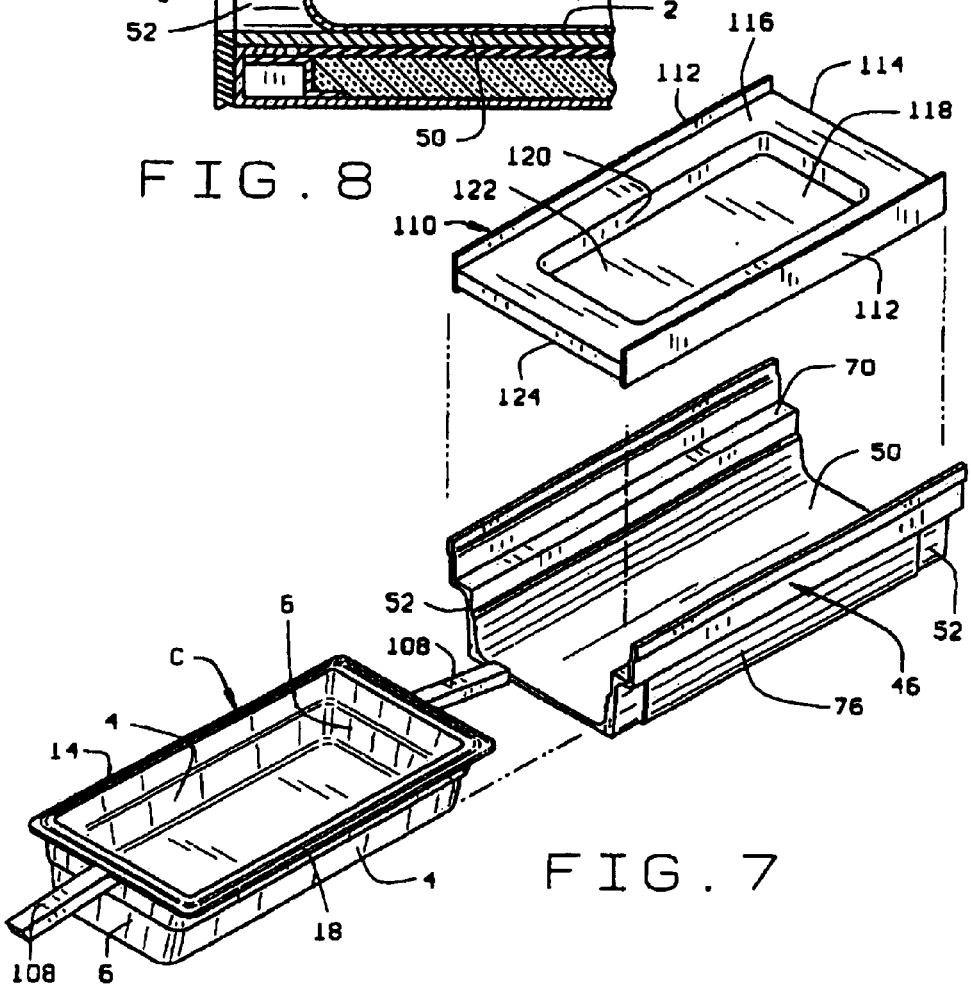
FIG. 7 is an exploded perspective view of the heat sink, a modified cover for the heat sink, and a modified tray.

A modified tray C (FIG. 7) may be used in the heat sinks 46 to keep foods warm, and it is similar to the tray B in all respects, except the provision for removing it from and inserting it into the heat sink 46. Whereas the tray B has handles 20 that are generally flat and extend the full width of the tray B, the tray C has handles 108 that are narrow and resemble the handles on household frying or sauce pans. The handles 108 project from the end walls 6 of the tray C where they are located near the peripheral lip 14, but are otherwise centered between the side walls 4.

Figure 8:
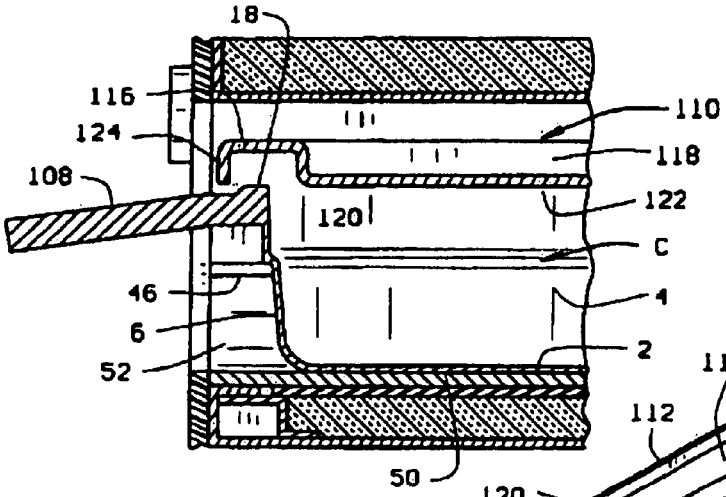
FIG. 8 is a fragmentary longitudinal sectional view of the modified tray of FIG. 7 fitted beneath the modified cover of FIG. 7.

Another modified cover 110 (FIGS. 7 & 8) works well with the tray C, but is also suitable for use with the tray B.

The cover 110 has legs 112 and a cross wall 114 extending horizontally between the legs 112 to which it is attached. The legs 112 do not differ from the legs 82 of the cover 80, and they rest on the horizontal shoulders 70 of the heat sink 46, even when the tray C is in the cavity 48 of the heat sink 46. Moreover, they extend up to and nearly contact the pan 38 that overlies the heat sink 46 in the cabinet 36. The cross wall 114 has an elevated region 116 where it is joined to the legs 112 and a depressed region 118 located within and being joined to the elevated region 116. The depressed region 118 has a peripheral wall 120 that is generally vertical and a bottom wall 122 which lies below, yet parallel to, the surrounding elevated region 116.

When the tray C is in the cavity 48 of the heat sink 46 (FIG. 8), the bottom surface of the elevated region 116 in the cross wall 114 lies directly above the upper surface 18 on the tray B, there being a gap of about 0.375 in. between the two surfaces. The peripheral wall 120, on the other hand, is set inwardly from the upper surface 18 of the tray C and inwardly from the upper ends of the side walls 4 and end walls 6 as well, with the gap being about 0.375 in. The lower surface of the bottom wall 122 lies in a horizontal plane that is slightly above the plane defined by the upper surface 18 on the tray C, with the spacing between the two planes being about 0.01 in. This spacing allows the tray C to be inserted into and removed from the cavity 48 of the heat sink 46 without interference from the cover 110.

At the ends of the cover 110 the elevated region 116 of the cross wall 114 turns downwardly in the form of a vertical lip 124, the lower edge of which lies in the plane of the lower surface on the bottom wall 122. When the tray C is in the heat sink 46, the lips 124 lie slightly beyond the upper surfaces 18 at the ends of the tray C, yet over or slightly beyond the depressed edges 16 at those ends. The lips 124 and the nearby segments of the peripheral wall 120 for the depressed region 118 create labyrinths which retard moisture from escaping from the tray C.

To enhance the seal established by the lips 124 and the depressed region 118 of the cover 110, the lips 124 may be fitted with elastomeric seal elements which bear against the end edges of the laterally directed lip 14 of the tray C beyond the two end walls 6 of the tray C. Likewise, elastomeric lip seals may also be fitted to the ends of the cross wall for the cover 80 to contact the lip 14 at the ends of the tray C and thereby enhance the sealing capabilities of the cover 80.

The rear panel 30 of the cabinet 26, in lieu of having openings 36, may be solid. In such an arrangement the rear panel 30 would block one end of the cavity 48 for each heat sink 46, and the heat sink 46 itself could wrap around the end of the cavity to close it and thus, transfer heat to that end wall 6 of the tray B which is presented toward the closed end. The other end of the heat sink 46 would remain open and indeed would open out of the cabinet 36 through the aligned opening 36 in the front panel 28. Of course, the handle 20 on that end of the tray B which faces the closed end of the heat sink 46 would have to be removed or reconfigured, so that it will not interfere with the solid rear panel 30.

Also, any tray B or C which must retain moisture may be fitted with a separate cover, and that would eliminate the need for the covers 80 or 110. In this regard, covers are available on the market for the traditional trays that resemble the trays B and C.

This invention is intended to cover all changes and modifications of the example of the invention herein chosen for purposes of the disclosure which do not constitute departures from the spirit and scope of the invention.

Re: HOLDING OR COOKING OVEN

| | | | |
|---|---|---|---|
| A | oven | 50 | bottom wall |
| B | trays | 52 | side walls |
| C | tray | 54 | flat bottom surface |
| 2 | bottom wall | 56 | flat top surface |
| 4 | side walls | 58 | lower region |
| 6 | end walls | 60 | flat outside surface |
| 8 | corners | 52 | contoured inside surface |
| 10 | offset portion | 64 | curved corner |
| 14 | lip | 66 | upper region |
| 16 | depressed edge | 68 | offsets |
| 18 | upper surface | 70 | flat horizontal shoulders |
| 20 | handles | 76 | heating element |
| 22 | | 78 | thermal insulation |
| 24 | | 80 | cover |
| 26 | cabinet | 82 | legs |
| 28 | front panel | 84 | cross wall |
| 30 | rear panel | 88 | stops |
| 32 | end panels | 90 | |
| 34 | top panel | 92 | electrical controls |
| 36 | opening | 100 | modified cover |
| 38 | upper pan | 102 | openings |
| 40 | lower pans | 104 | slide |
| 41 | lips | 106 | openings |
| 42 | channels | 108 | handles |
| 43 | lips | 110 | modified cover |
| 44 | rigidifying members | 112 | legs |
| 46 | heat sink | 114 | cross wall |
| 48 | cavity | 116 | elevated region |
| | | 118 | depressed region |
| | | 120 | peripheral wall |
| | | 122 | bottom wall |
| | | 124 | vertical lip |

What is claimed is:

1. In combination with a heating device and with a tray located within the heating device and having a rim that is presented upwardly around the interior of the tray, a self-supporting cover for establishing at least a partial closure over the rim of the tray, said cover comprising: first and second legs in an upright orientation and having lower margins for supporting the cover, the legs being spaced far enough apart to receive the rim of the tray between them; and a cross wall attached to the legs above their lower margins and extending between the legs, the space between the legs and below the cross wall being open at at least one end of the cover, so that the rim of the tray may be inserted between the legs and below the cross wall at that end of the cover.

2. The combination according to claim 1 wherein the legs also have upper margins, and the cover is attached to the legs intermediate the upper and lower margins of the legs.

3. The combination according to claim 1 wherein the space between the legs and below the cross wall is open at both ends of the cover.

4. The combination according to claim 1 wherein the cross wall, where space between the legs and below the cross wall is open, flares upwardly.

5. The combination according to claim 1 wherein the rim of the tray is generally rectangular, having ends and sides, with the sides being longer then the ends; and wherein the sides of the rim on the tray are located along the legs of the cover.

6. The combination according to claim 1 wherein the legs of the cover also have upper margins; and wherein the cross wall is attached to each leg intermediate the upper and lower margins for the leg, but closer to one of such margins than the other.

7. The combination according to claim 1 wherein the cross wall of the cover contains at least one opening for venting the interior of the tray.

8. The combination according to claim 7 wherein the cover further includes a slide that moves along the cross wall of the cover between a closed position in which the opening is closed and open positions in which the opening is exposed.

9. The combination according to claim 1 wherein the cross wall of the cover contains a plurality of openings arranged in a row; and wherein the cover further includes a slide which is located along the cross wall and has openings also arranged in a row, the slide being movable along the cross wall between a closed position and open positions, the slide when in its closed position covering the openings in the cross wall and when in its open positions at least partially exposing the openings in the cross wall through the openings in the slide.

10. In combination according to claim 1 wherein the cross wall of the cover contains a plurality of openings sized for venting moisture from the tray.

11. In combination with a heat sink having shoulders and a tray located within the heat sink, a cover for at least partially closing the tray while the tray is in the heat sink, said cover comprising: upright legs which are located over the shoulders of the heat sink and project upwardly away from the shoulders; and a cross wall extending between the legs and the tray.

12. The combination according to claim 11 wherein the legs of the cover are located beyond the rim on the tray.

13. The combination according to claim 11 wherein the legs of the cover are located beyond the rim on the tray and rest on the shoulders of the heat sink, whereby the tray at its nm is between the legs of the cover.

14. The combination according to claim 11 wherein the legs of the cover have lower margins and the cover is attached to the legs above their lower margins; and wherein the space between the legs and below the cover is open at at least one end of the cover so that the tray at its rim may be inserted into and removed from the space below the cross wall on the cover.

15. The combination according to claim 14 wherein the legs have upper margins, and the cross wall is attached to the legs below the upper margins.

16. The combination according to claim 15 wherein the spacing between the upper margins and the cross wall differs from the spacing between the lower margins and the cross wall.

17. The combination according to claim 11 wherein the cross wall of the cover contains at least one opening.

18. The combination according to claim 17 wherein the cover further includes a slide that moves along the cross wall of the cover between a closed position in which the opening is closed and open positions in which the opening is exposed.

19. The combination according to claim 11 wherein the cross wall of the cover contains a plurality of openings arranged in a row; and wherein the cover further includes a slide which is located along the cross wall and has openings also arranged in a row, the slide being movable along the cross wall between a closed position and open positions, the slide when in its closed position covering the openings in the cross wall and when in its open position at least partially exposing the openings in the cross wall through the openings in the slide.

20. An oven comprising:

a cabinet;

a plurality of trays adapted to be inserted in the cabinet and withdrawn from the cabinet, each tray having a bottom wall, side walls extending upwardly from the bottom wall, and an open top;

self-supporting covers in the cabinet for respective trays, each cover having a generally horizontal cross wall and a pair of side walls extending downwardly from the cross wall at opposite sides of the cross wall, said cross wall having a width which exceeds the width of a respective tray to allow the tray to be positioned in the cabinet between the side walls of the cover with the cross wall extending over the open top of the tray;

each cover being releasably retained in the cabinet against withdrawal from the cabinet when a respective tray is removed from between the side walls of the cover and withdrawn from the cabinet, the side walls of the cover supporting the cover in the cabinet after the tray has been withdrawn from the cabinet; and a heating element positioned in the cabinet to direct heat into trays in the cabinet.

21. An oven as set forth in claim 20 wherein the cross wall of at least one cover has at least one opening in it to vent a tray located beneath the cover.

22. An oven comprising:

a cabinet;

horizontal shoulders in the cabinet;

a plurality of trays adapted to be inserted in the cabinet and withdrawn from the cabinet, each tray having a bottom wall, side walls extending upwardly from the bottom wall, and an open top;

covers in the cabinet for respective trays, each cover having a generally horizontal cross wall and a pair of side walls extending downwardly from the cross wall at opposite sides of the cross wall over respective horizontal shoulders in the cabinet, said cross wall having a width which exceeds the width of a respective tray to allow the tray to be positioned in the cabinet between the side walls of the cover with the cross wall extending over the open top of the tray;

each cover being releasably retained in the cabinet against withdrawal from the cabinet when a respective tray is removed from between the side walls of the cover and withdrawn from the cabinet, the side walls of the cover resting on said respective shoulders after the tray has been withdrawn from the cabinet; and at least one opening in the cross wall of at least one of said covers for venting the cover.

*23. An oven comprising*

*a cabinet having a plurality of compartments therein,*

*a plurality of trays in said compartments, eash compartment being sized for receiving only one tray per compartment,*

*said compartments being isolated from one another in said cabinet whereby flavor from food in one tray in one compartment is prevented from transferring to food in trays in adjacent compartments,*

*each compartment having open ends for placement of said tray in the compartment and removal of said tray from the compartment, and*

*a plurality of heaters, each heater being operable for heating a respective compartment.*

*24. The oven as set forth in claim 23 wherein each compartment has a bottom wall heated by a respective heater.*

*25. The oven as set forth in claim 24 wherein each compartment has side walls, and wherein said bottom and side walls of each compartment are formed by a unitary member.*

*26. The oven as set forth in claim 25 wherein said unitary member is generally U-shaped.*

*27. The oven as set forth in claim 25 wherein said unitary member is a metal heat sink.*

*28. The oven as set forth in claim 23 further comprising a cover in at least one of said compartments for covering a tray in the compartment.*

*29. The oven as set forth in claim 28 wherein said cover is a rigid cover supported in a position over the tray.*

*30. The oven as set forth in claim 29 wherein said cover comprises a generally horizontal cross wall spanning the top of the tray.*

*31. The oven as set forth in claim 30 wherein said cover comprises a pair of side walls extending vertically from the cross wall at opposite sides of the cross wall.*

*32. The oven as set forth in claim 29 wherein said at least one compartment has side walls with shoulders for supporting said cover over the tray in the compartment.*

*33. The oven as set forth in claim 32 wherein the side walls of said at least one compartment are spaced apart approximately 1 inch greater than a width of said respective tray.*

*34. The oven as set forth in claim 23 wherein said heaters also heat side walls of the compartments.*

*35. The oven as set forth in claim 23 further comprising a control for controlling the operation of the heaters.*

*36. The oven as set forth in claim 35 wherein said control controls the operation of at least one group of heaters independently of another group of heaters.*

*37. The oven as set forth in claim 35 wherein said control controls the operation of each heater independently of the other heaters.*

*38. An oven as set forth in claimm 23 wherein said plurality of compartments includes side-by-side compartments.*

*39. An oven comprising*

*a cabinet having a plurality of compartments therein,*

*a plurality of trays in said compartments, each compartment being sized for receiving only one tray per compartment,*

*said compartments being isolated from one another in said cabinet whereby flavor from food in one tray in one compartment is prevented from transferring to food in trays in adjacent compartments,*

*each compartment having open ends for placement of said tray in the compartment and removal of said tray from the compartment,*

*a plurality of heaters for heating said plurality of compartments, the operation of each of said plurality of heaters being controlled independently of the other heaters.*

*40. An oven as set forth in claim 39 wherein each of said plurality of compartments has one of said plurality of heaters adjacent thereto for heating the compartment.*

*41. An oven as set forth in claim 40 further comprising a cover in at least one of said plurality of compartments for covering a tray in the compartment.*

*42. An oven as set forth in claim 41 wherein said at least one of said plurality of compartments has side walls with shoulders for supporting said cover over a tray in the compartment.*

*43. An oven as set forth in claim 39 wherein said plurality of compartments includes side-by-side compartments.*

*44. An oven comprising*

*a cabinet having a plurality of compartments therein,*

*a plurality of trays in said compartments, each compartment being sized for receiving only one tray per compartment,*

*said compartments being isolated from one another in said cabinet whereby flavor from food in one tray in one compartment is prevented from transferring to food in trays in adjacent compartments,*

*each compartment having open ends for placement of said tray in the compartment and removal of said tray from the compartment,*

*a plurality of heaters for heating said plurality of compartments, each compartment being heated by one of said plurality of heaters located adjacent the compartment,*

*the operation of at least one group of said plurality of heaters being controlled independently of another group of said plurality of heaters, and*

*a cover in at least one of said plurality of compartments for covering a tray in the compartment.*

*45. An oven as set forth in claim 44 wherein said at least one of said plurality of compartments has side walls with shoulders for supporting said cover over a tray in the compartment.*

*46. An oven as set forth in claim 44 wherein said plurality of compartments includes side-by-side compartments.* An oven as set forth in claim 42 wherein said at least one of said plurality of compartments has side walls with shoulders for supporting said cover over a tray in the compartment.

* * * * *